Figure 3:
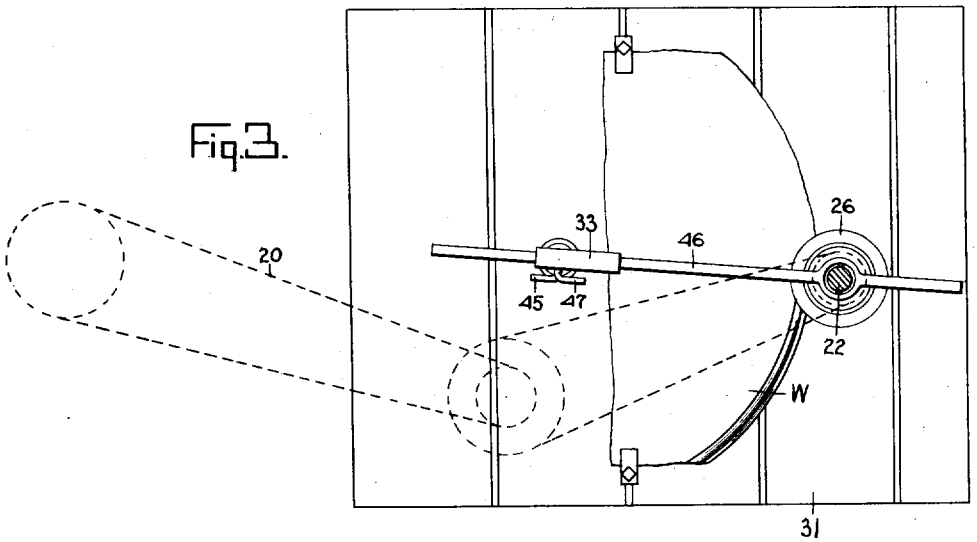

O. BAUER.
UNIVERSAL STONEWORKING MACHINE.
APPLICATION FILED FEB. 17, 1915.
Reissued May 18, 1915.
13,918.
2 SHEETS—SHEET 1.
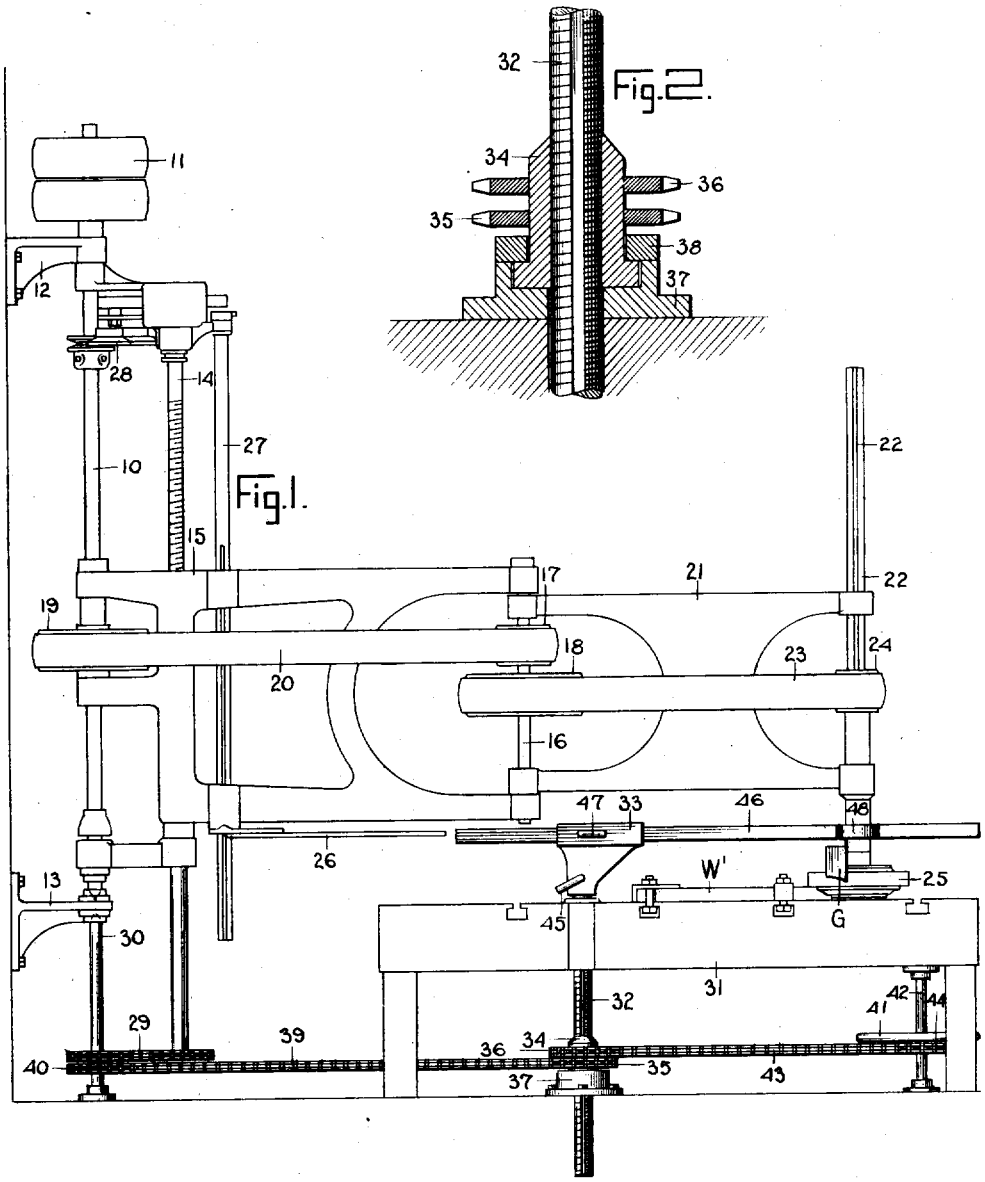
WITNESSES
C. H. Reichenbach
Geo. L. Beeler
INVENTOR
Oscar Bauer
BY
ATTORNEYS
THE NORRIS PETERS CO., PHOTO-LITHO., WASHINGTON, D. C.

O. BAUER.

UNIVERSAL STONEWORKING MACHINE.

APPLICATION FILED FEB. 17, 1915.

Reissued May 18, 1915.

13,918.

2 SHEETS—SHEET 2.

WITNESSES

C. K. Reichenbach.

Geo. L. Beeler

INVENTOR

Oscar Bauer

BY

ATTORNEYS

THE NORRIS PETERS CO., PHOTO-LITHO., WASHINGTON, D. C.

UNITED STATES PATENT OFFICE.

OSCAR BAUER, OF NEW YORK, N. Y.

UNIVERSAL STONEWORKING-MACHINE.

13,918. Specification of Reissued Letters Patent. Reissued May 18, 1915.

Original No. 1,112,250, dated September 29, 1914, Serial No. 823,539. Application for reissue filed February 17, 1915. Serial No. 8,989.

*To all whom it may concern:*

Be it known that I, OSCAR BAUER, a citizen of the United States, and a resident of the city of New York, borough of Brooklyn, in the county of Kings and State of New York, have invented a new and Improved Universal Stoneworking-Machine, of which the following is a full, clear, and exact description.

This invention relates to grinding and polishing machines, and particularly to such machines as are employed in stone cutting or grinding.

Among the objects of the invention is to provide an attachment for an ordinary stoneworking machine whereby the grinding wheel may be adjusted vertically simultaneously with the usual adjustments of the radius arms of the machine.

Another object of the invention is to provide a means for manipulating the vertically adjusting mechanism by hand auxiliary to the usual power driven adjusting devices.

A still further object of the invention is to provide, in connection with the bed of the machine, a centering or supporting screw and to connect to said screw a cross head for the support of a guide arm in which is journaled and supported the grinding wheel.

The foregoing and other objects of the invention will hereinafter be more fully described and claimed and illustrated in the drawings forming a part of this specification in which like characters of reference indicate corresponding parts in all the views, and in which—

Figure 4:
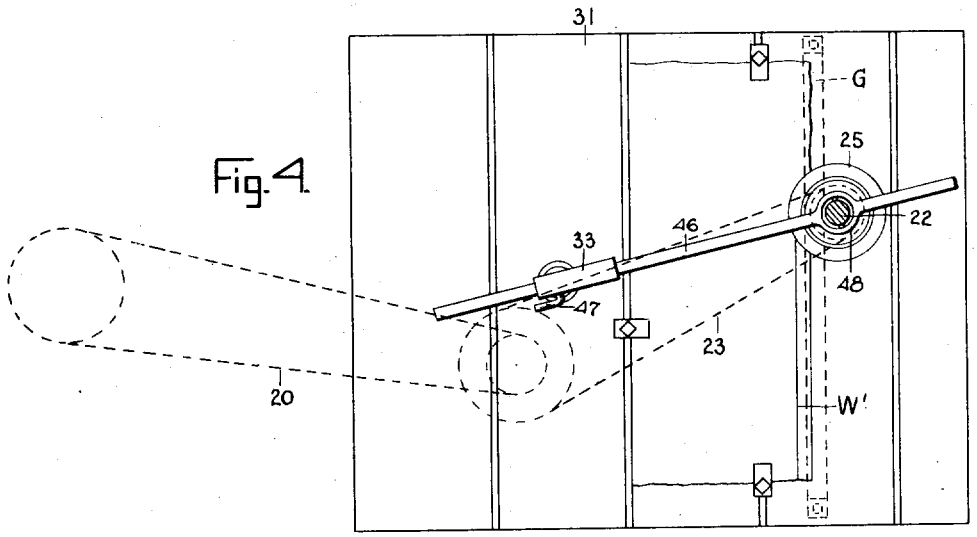

Figure 1 is a side elevation of a preferred embodiment of the invention; Fig. 2 is a detail view showing the means for supporting and adjusting the guide bar supporting screw; Fig. 3 is a plan view showing the device adapted for forming curved surfaces; and Fig. 4 is a similar view showing the adaptation of the improvement to the forming of straight surfaces.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring briefly to the illustration in Fig. 1, I show at 10 a vertical driving shaft having associated therewith tight and loose pulleys 11 whereby the rotation of the shaft may be controlled from any suitable source of power (not shown). Said shaft is journaled in bearings 12 and 13, and arranged parallel thereto is an adjusting screw 14 cooperating with the body of a frame 15 occupying a substantially vertical plane coincident with the axes of the shaft 10 and screw 14. The outer end of the frame member 15 carries a countershaft 16 having a pair of pulleys 17 and 18. The shaft 10 has a pulley 19 from which a belt 20 operates over the pulley 17, driving the countershaft and larger pulley 18. At 21 I show a well known form of radius arm journaled for free swinging movement around the axis of the countershaft 16 and journaled in its outer end is a shaft 22 rotated by a belt 23 leading from the pulley 18 to and around a smaller pulley 24 connected to the shaft. The pulley 24 drives the shaft 22 as by a key or spline (not shown) acting in a groove 22′, allowing certain independent vertical movement between the arm 21 and said shaft. A grinding wheel 25 of any suitable character is rigidly connected to the lower end of the wheel shaft 22 and hence is driven therewith at high speed from the initial shaft 10 in all positions of adjustment of the radius arm 21.

At 26 I show a lever associated with a rock shaft 27 for the purpose of rotating the screw 14 through gearing 28 from the driving shaft 10 for the ordinary vertical adjustment of the frame 15 and driving means associated therewith.

As shown in Fig. 1, the screw 14 is extended downwardly below the frame 15 and is connected by chain and sprocket gearing 29 with a comparatively short vertical shaft 30 in alinement with the driving shaft 10 and arranged in bearings below the same. While the frame 15 is adapted to swing laterally in either direction around the axis of the driving shaft 10, the screw 14 and gearing 29 are adapted to swing similarly.

At 31 I show a work supporting bed of any usual or approved construction and associated therewith and extending preferably vertically therethrough is a non-rotary adjustment screw 32 carrying at its upper end a cross head 33. The screw 32 is supported upon and adjusted by means of a rotary nut 34 to which are connected sprocket gears 35 and 36. Said nut is journaled upon a base member 37 where it is secured by a collar 38 beneath the bed 31. A sprocket chain 39 leads from a sprocket gear 40 connected to the short shaft 30 to the sprocket wheel 35 whereby rotation of the screw 14 will cause rotation of the short shaft 30 and nut 34, the rotation of the parts 14 and 34 being simultaneous. It will be noted also that the threads on the screws 14 and 32 may be of the same character and of equal pitch. It follows, therefore, that simultaneously with the adjustment of the main frame 15 and radius arm 21 by operation of the main screw 14, the auxiliary screw 32 may cause the adjustment of the cross head 33 in the same direction and to the same extent.

At 41 I show a hand wheel adjacent the front of the bed and within easy reach of the operator, said wheel being connected to a short vertical shaft 42. A sprocket chain 43 leads from a sprocket wheel 44 connected to the hand wheel 41 to and around the aforesaid sprocket wheel 36 connected to the nut. By manipulation of the hand wheel 41 the operator is enabled to adjust the mechanism by hand when a comparatively slight adjustment is required to delicately position the mechanism. When, however, the adjustment is being effected by means of the main screw 14, the hand wheel 41 may rotate idly and with no effect.

The cross head 33 carried by the upper end of the auxiliary screw 32 is adapted to be locked thereto by any suitable means such, for instance, as a set screw 45, but under ordinary circumstances it is allowed to swivel freely upon said screw. The cross head also includes a horizontal socket in which is mounted a guide bar 46 which may slide freely through the socket or be secured therein in fixed position by means of a set screw 47. The outer end of the guide bar may constitute a handle whereby the operator may manipulate the grinding wheel 25, the shaft of which is extended through and journaled in a bearing 48 of said bar. When both set screws 45 and 47 are loose, it is obvious that the guide bar 46 will be free to rotate around the axis of the screw 32 and also slide longitudinally through the socket of the cross head so as to accommodate itself to the desired movements of the grinding wheel in a fixed plane for cutting or grinding a special or irregular form of edge upon the block or slab, the radius arm 21 conforming in its movements to the movements of the wheel 25 at such time.

This machine is designed especially for forming irregular molded surfaces or edges on blocks or slabs of stone or marble by the operation of a molded grinding wheel. I am aware that numerous machines have been made for polishing the flat surfaces of a block of stone, the polishing tool for such purpose being adapted to move more or less freely in every direction thereover, but for the purpose of this invention it is essential that the tool, while being guided and supported for universal movement in a certain plane coinciding with the plane of the slab, must be mounted upon a rigid shaft and must be held rigidly and absolutely in the intended plane of operation; otherwise it would be impossible for a molded or irregular surface to be cut or ground upon the edge of the slab. In other words, the grinding wheel must be adapted to be adjusted freely in all directions and to any desired extent in a certain plane, and must be so supported that any deviation or wabbling of the grinding wheel above or below said plane would render the machine useless for its purpose. The abrasive cutting action of the wheel is always in directions parallel to the work-supporting bed 31, as distinguished from toward the bed as in ordinary polishing machines.

As shown in Fig. 3, the set screw 47 upon being set to lock the guide bar to the socket piece, the bar constitutes a radius arm for dressing curved surfaces having a center of curvature coincident with the axis of the screw, as shown at W. When, however, as shown in Fig. 4, a straight surface is desired to be cut as shown at W′, the set screw 47 may be loosened and any suitable guiding means G associated with the shaft 22 of the wheel 25 may be provided to cause the axis of the shaft to be caused to operate in a plane parallel with it, carrying the cutting wheel in a straight line in any desired direction.

I claim:

1. The combination with a driving shaft, a grinding wheel, driving means extending from the shaft to said wheel, supporting devices for the driving means, and a power screw adapted to vertically adjust said driving means and supporting devices, of a hand controlled guide member associated with said grinding wheel, and means extending from said main power screw to cause the adjustment of said guide member and wheel simultaneously with the adjustment of the driving means.

2. The combination with a driving shaft, a frame connected to the driving shaft and adapted to be swung laterally around the axis thereof, a grinding wheel associated with the outer end of said frame, a power screw coöperating with said frame for lifting or lowering it, and a work supporting bed beneath the wheel, of an auxiliary screw associated with the bed, a guide bar connected to said auxiliary screw and to the axis of the grinding wheel, and means to operate the main and auxiliary screws simultaneously for lifting and lowering the guide bar simultaneously with the aforesaid movements of the frame.

3. In a device of the character set forth, the combination of a guide bar, main and auxiliary screws arranged parallel to each other, said guide bar being associated with the auxiliary screw, and means for rotating the two screws simultaneously in the same direction either by power or by hand, substantially as set forth.

4. In a machine for forming irregular or molded surfaces on stone, a rigid vertical shaft adapted to rotate at high speed, a grinding wheel rigidly secured to the lower end of said shaft and having a periphery of required shape, a vertically adjustable guide arm for said shaft and wheel, means for supporting said guide arm and providing for free movement of the wheel in all directions in a certain plane, whereby the wheel may be operated to cause its periphery to produce a complemental result on the work, and means serving to maintain the wheel absolutely in said plane irrespective of its rapid rotation and the aforesaid free movement.

5. In a universal stone working machine, the combination of a horizontal bed for supporting the work, a grinding wheel having a molded cutting periphery, a shaft perpendicular to the bed to which said wheel is rigidly connected, a rigid arm supporting the shaft and wheel for free movement in any direction parallel to the bed, a guiding support for said arm adjustable perpendicularly of the bed but maintaining the wheel in an absolutely fixed plane determined by such adjustment, and means to rotate the shaft and wheel at high speed irrespective of said free movement and said adjustment, the cutting action of the wheel being in directions parallel to the bed.

In testimony whereof I have signed my name to this specification in the presence of two subscribing witnesses.

OSCAR BAUER.

Witnesses:
GEO. L. BEELER,
G. H. EMSLIE.

Copies of this patent may be obtained for five cents each, by addressing the "Commissioner of Patents, Washington, D. C."